| (12) | United States Patent | (10) Patent No.: | US 10,755,441 B1 |
|---|---|---|---|
| | Shieh et al. | (45) Date of Patent: | Aug. 25, 2020 |

(54) GEOMETRIC CAMERA CALIBRATION SYSTEM AND METHOD

(71) Applicants: NCKU Research and Development Foundation, Tainan (TW); Himax Technologies Limited, Tainan (TW)

(72) Inventors: Ming-Der Shieh, Tainan (TW); Chun-Wei Chen, Tainan (TW); Teng-Feng Liao, Tainan (TW); Yu-Cheng Chen, Tainan (TW)

(73) Assignees: NCKU Research and Development Foundation, Tainan (TW); Himax Technologies Limited, Tainan (TW)

( * ) Notice: Subject to any disclaimer, the term of this patent is extended or adjusted under 35 U.S.C. 154(b) by 0 days.

(21) Appl. No.: 16/687,183

(22) Filed: Nov. 18, 2019

(51) Int. Cl.
| *H04N 9/31* | (2006.01) |
| *H04N 13/00* | (2018.01) |
| *H04N 17/00* | (2006.01) |
| *G06T 7/80* | (2017.01) |
| *G06T 7/33* | (2017.01) |
| *G06T 7/521* | (2017.01) |

(52) U.S. Cl.
CPC ............... *G06T 7/80* (2017.01); *G06T 7/337* (2017.01); *G06T 7/521* (2017.01); *H04N 9/3194* (2013.01); *G06T 2207/10024* (2013.01); *G06T 2207/10028* (2013.01)

(58) Field of Classification Search
CPC ... H04N 2013/0081; H04N 2013/0074; H04N 13/246; H04N 13/239; H04N 13/296; H04N 17/00; H04N 17/002; H04N 9/3194; H04N 9/31; H04N 9/3191; G06T 2207/10021; G06T 2207/10024; G06T 2207/10028; G06T 7/80; G06T 7/521; G06T 7/75; G06T 7/337
USPC ............ 348/46, 42, 180, 187, 188; 382/154; 345/419, 644, 8
See application file for complete search history.

(56) References Cited

U.S. PATENT DOCUMENTS

| 2019/0058870 A1* | 2/2019 | Rowell | ................ H04N 13/246 |
| 2019/0236805 A1* | 8/2019 | Mou | ......................... G06T 7/80 |

\* cited by examiner

*Primary Examiner* — Sherrie Hsia
(74) *Attorney, Agent, or Firm* — Donald E. Stout; Stout, Uxa & Buyan, LLP

(57) ABSTRACT

A geometric camera calibration system includes an extrinsic iterative closest point (ICP) device that generates an estimated extrinsic matrix by adjusting an initial extrinsic matrix according to first 3D points in camera coordinates; and an intrinsic ICP device that receives 3D points in chessboard coordinates and accordingly generates an error metric between the 3D points in chessboard coordinates and predetermined second reference 3D points. The extrinsic ICP device performs ICP operation to minimize difference between the 3D points in camera coordinates and predetermined first reference 3D points. A current intrinsic matrix is then outputted as an updated intrinsic matrix if a current error metric is not greater than a previous error metric.

12 Claims, 2 Drawing Sheets

GEOMETRIC CAMERA CALIBRATION SYSTEM AND METHOD

BACKGROUND OF THE INVENTION

1. Field of the Invention

The present invention generally relates to machine vision, and more particularly to geometric camera calibration.

2. Description of Related Art

Geometric camera calibration, also called camera resectioning, is a process of estimating parameters of a camera model (e.g., pinhole camera model) approximating an image or video camera. The parameters are commonly represented in a camera matrix (e.g., 4-by-3 matrix) composed of an extrinsic matrix representing the location of the camera in a 3D scene and an intrinsic matrix representing an optical center and focal length of the camera. The estimated parameters may be adapted to machine vision that provides imaging-based automatic inspection and analysis for applications such as automatic inspection, process control and robot guidance.

Conventional camera calibration methods ordinarily suffer significant error. A need has thus arisen to propose a novel camera calibration with reduced error.

SUMMARY OF THE INVENTION

In view of the foregoing, it is an object of the embodiment of the present invention to provide a geometric camera calibration system and method of estimating parameters of a camera model capable of substantially reducing error.

According to one embodiment, a geometric camera calibration system includes an extrinsic iterative closest point (ICP) device and an intrinsic ICP device. The extrinsic ICP device generates an estimated extrinsic matrix by adjusting an initial extrinsic matrix according to first 3D points in camera coordinates. The intrinsic ICP device receives 3D points in chessboard coordinates and accordingly generates an error metric between the 3D points in chessboard coordinates and predetermined second reference 3D points. The extrinsic ICP device performs ICP operation to minimize difference between the 3D points in camera coordinates and predetermined first reference 3D points. A current intrinsic matrix is then outputted as an updated intrinsic matrix if a current error metric is not greater than a previous error metric.

DETAILED DESCRIPTION OF THE INVENTION

Figure 1:
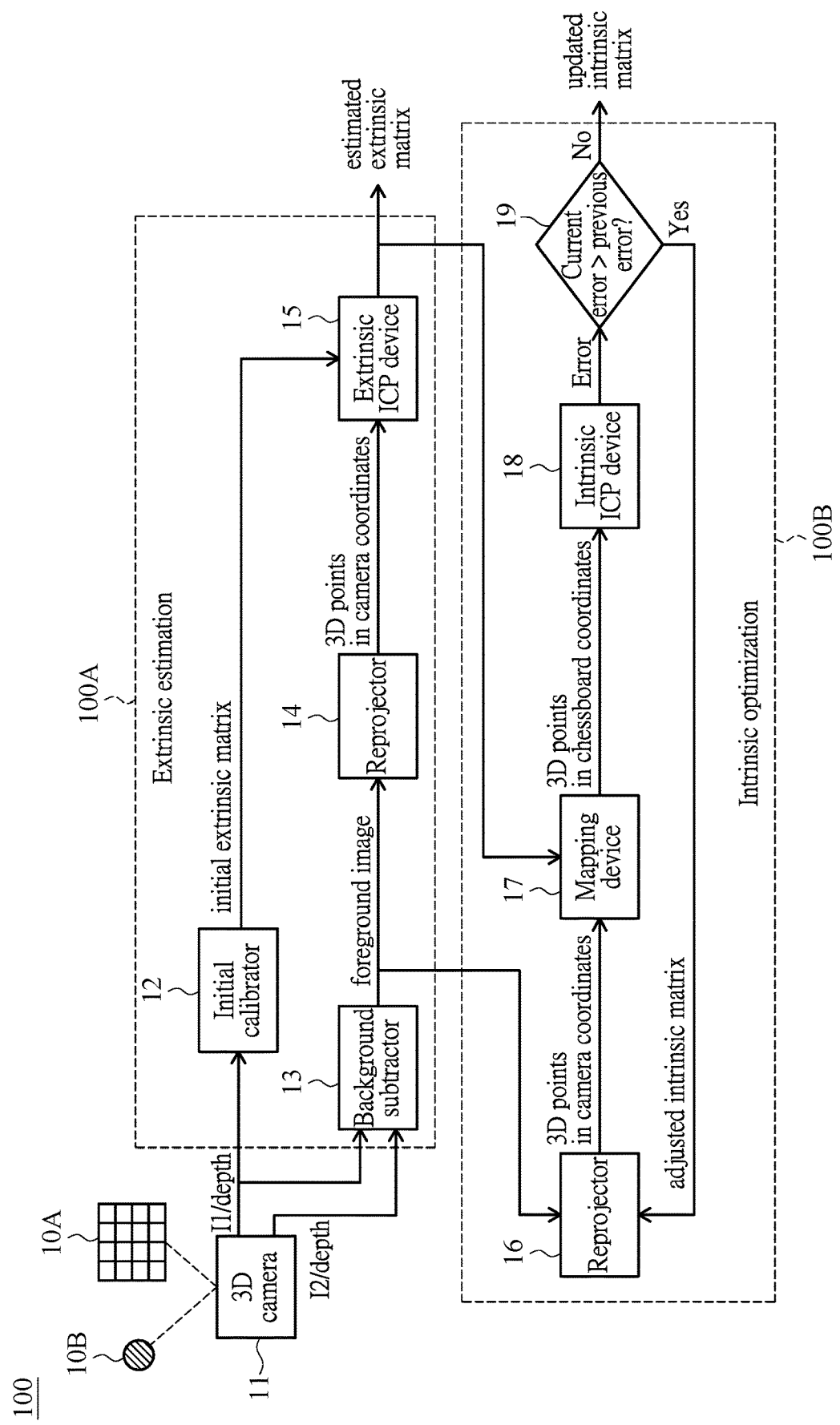
FIG. 1 shows a block diagram illustrating a geometric camera calibration system according to one embodiment of the present invention.
Figure 2:
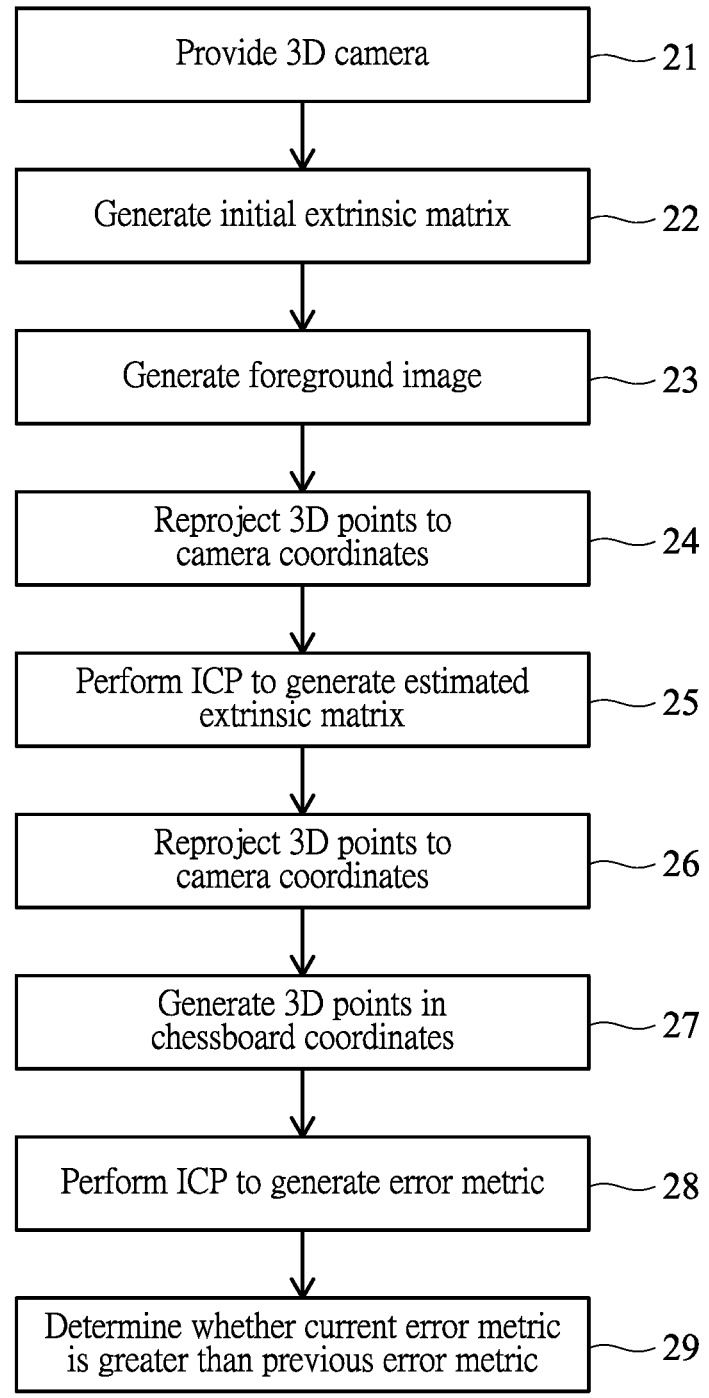
FIG. 2 shows a flow diagram illustrating a geometric camera calibration method according to one embodiment of the present invention.

FIG. 1 shows a block diagram illustrating a geometric camera calibration system 100 according to one embodiment of the present invention, and FIG. 2 shows a flow diagram illustrating a geometric camera calibration method 200 according to one embodiment of the present invention. The blocks of the geometric camera calibration system ("system" hereinafter) 100 and the steps of the geometric camera calibration method ("method" hereinafter) 200 may be implemented by electrical circuits, computer software or their combination. For example, at least a portion of the system 100 and the method 200 may be performed in a digital image processor. In another example, at least a portion of the system 100 and the method 200 may be implemented by an instruction-controlled computer. In one exemplary embodiment, the system 100 and the method 200 may be adapted to an augmented reality (AR) device. Hardware components for the AR device may primarily include a processor (e.g., an image processor), a display (e.g., head-mounted display) and sensors (e.g., a color-depth camera such as RGB-D camera for red, green, blue plus depth). Specifically, the sensors or camera captures scenes to generate image frames, which are then fed to the processor that performs the operations of the system 100 and the method 200. Augmented reality is then rendered in the display.

In the embodiment, the system 100 may include an extrinsic estimation device 100A configured to generate an estimated extrinsic (parameter) matrix, and an intrinsic optimization device 100B configured to generate an updated intrinsic (parameter) matrix. In this specification, as generally used in the computer or machine vision field, an extrinsic (parameter) matrix is composed of extrinsic parameters representing location and orientation of a camera in a three-dimensional (3D) scene, and an intrinsic (parameter) matrix is composed of intrinsic parameters representing an optical center and focal length of a camera. The extrinsic matrix may be used to transform points from system (or world) coordinates to camera coordinates, and the intrinsic matrix may be used to map points from camera coordinates to image coordinates (associated with an image plane).

The system 100 may include at least one 3D camera 11 provided to capture images (step 21). Specifically, the 3D camera 11 may capture a first image I1 with an associated depth image of a chessboard 10A having a predetermined feature pattern (e.g., a chequered pattern of a checkerboard) but without a given object 10B; and may capture a second image I2 with an associated depth image of the chessboard 10A with the object 10B. In the specification, a 3D camera (e.g., RGB-D camera) is a camera capable of capturing a depth (D) image in addition to a color (e.g., red (R), green (G) and blue (B)) image.

In the embodiment, the extrinsic estimation device 100A may include an initial calibrator 12 coupled to receive the first image I1 (i.e., the image without the object 10B) and configured to generate an initial extrinsic matrix according to the first image I1 (step 22). The initial calibrator 12 may also generate an (initial) intrinsic matrix.

The extrinsic estimation device 100A of the embodiment may include a background subtractor 13 coupled to receive the first image I1 (with the associated depth image) and the second image I2 (with the associated depth image), and configured to generate a foreground image (representing the object 10B) containing an associated depth image thereof according to the first image I1 (and the associated depth image) and the second image I2 (and the associated depth image) (step 23), for example, by a background segmentation or background subtraction technique.

The extrinsic estimation device 100A of the embodiment may include a (first) reprojector 14 coupled to receive the foreground image (with the associated depth image) and configured to map (or reproject) 3D points of the foreground image from image coordinates to camera coordinates based on the (initial or current) intrinsic matrix, thereby generating (first) 3D points in camera coordinates (step 24).

According to one aspect of the embodiment, the extrinsic estimation device 100A may include an extrinsic iterative closest point (ICP) device 15 configured to generate the estimated extrinsic matrix (step 25) by adjusting the initial extrinsic matrix (from the initial calibrator 12) according to the 3D points in camera coordinates (from the reprojector 14). Specifically, the extrinsic ICP device 15 may perform ICP operation to minimize difference between the 3D points in camera coordinates and predetermined first reference (or golden) 3D points, where the initial extrinsic matrix may be used as an initial solution of ICP operation performed in the extrinsic ICP device 15 to generate the estimated extrinsic matrix as the output of the extrinsic estimation device 100A. Details of ICP operation may be referred to "Fast Visual Odometry Using Intensity-Assisted Iterative Closest Point," entitled to Shile Li et al., July 2016, IEEE ROBOTICS AND AUTOMATION LETTERS, VOL. 1, NO. 2; "Dense Visual SLAM for RGB-D Cameras," entitled to Christian Kerl et al., 2013, Proc. of the Int. Conf. on Intelligent Robot Systems (IROS); "Multiview Registration for Large Data Sets," entitled to Kari Pulli, October 1999, Second International Conference on 3D Digital Imaging and Modeling; and "Tracking a Depth Camera: Parameter Exploration for Fast ICP," entitled to Francois Pomerleau et al., September 2011, IEEE/RSJ International Conference on Intelligent Robots and Systems, the disclosures of which are incorporated herein by reference.

In the embodiment, the intrinsic optimization device 100B may include a (second) reprojector 16 (performed in a manner similar to the first reprojector 14) coupled to receive the foreground image (with the associated depth image from the background subtractor 13) and configured to map (or reproject) 3D points of the foreground image from image coordinates to camera coordinates based on a current intrinsic matrix, thereby generating (second) 3D points in camera coordinates (step 26).

The intrinsic optimization device 100B of the embodiment may include a mapping device 17 coupled to receive the 3D point in camera coordinates (from the reprojector 16) and configured to map the 3D points from camera coordinates to (3D) chessboard coordinates associated with the chessboard 10A, thereby generating 3D points in chessboard coordinates (step 27).

The intrinsic optimization device 100B of the embodiment may include an intrinsic iterative closest point (ICP) device 18 coupled to receive the 3D points in chessboard coordinates and configured to generate an error metric between the 3D points in chessboard coordinates and predetermined second reference (or golden) 3D points (step 28). Specifically, the intrinsic ICP device may perform ICP operation to find correspondence and transformation between the 3D points in chessboard coordinates and predetermined second reference 3D points. In the embodiment, sum of squared differences may be used as a cost function for performing ICP in the intrinsic ICP device 18.

The intrinsic optimization device 100B of the embodiment may include a determination device 19 coupled to receive the error metric (from the intrinsic ICP device 18) and configured to determine whether a current error metric (of the current ICP iteration) is greater than a previous error metric (of the previous ICP iteration) (step 29). It is appreciated that the determination device 19 may be implemented in the intrinsic ICP device 18. If a result of the determination device 19 is positive (i.e., current error metric>previous error metric), intrinsic parameters of a current intrinsic matrix are adjusted to result in an adjusted intrinsic matrix, according to which the reprojector 16 may perform again. If the result of the determination device 19 is negative (i.e., current error metric <=previous error metric), the current intrinsic matrix is then outputted as the updated intrinsic matrix.

Although specific embodiments have been illustrated and described, it will be appreciated by those skilled in the art that various modifications may be made without departing from the scope of the present invention, which is intended to be limited solely by the appended claims.

What is claimed is:

1. A geometric camera calibration system, comprising:
an extrinsic iterative closest point (ICP) device that generates an estimated extrinsic matrix by adjusting an initial extrinsic matrix according to first 3D points in camera coordinates; and
an intrinsic ICP device that receives 3D points in chessboard coordinates and accordingly generates an error metric between the 3D points in chessboard coordinates and predetermined second reference 3D points;
wherein the extrinsic ICP device performs ICP operation to minimize difference between the 3D points in camera coordinates and predetermined first reference 3D points; and
wherein a current intrinsic matrix is then outputted as an updated intrinsic matrix if a current error metric is not greater than a previous error metric.

2. The system of claim 1, wherein the initial extrinsic matrix is used as an initial solution of the ICP operation performed in the extrinsic ICP device to generate the estimated extrinsic matrix.

3. The system of claim 1, further comprising at least one three-dimensional (3D) camera that captures a first image with an associated depth image of a chessboard having a predetermined feature pattern without a given object, and captures a second image with an associated depth image of the chessboard with the object.

4. The system of claim 3, further comprising:
an initial calibrator that generates the initial extrinsic matrix according to the first image.

5. The system of claim 3, further comprising:
a background subtractor that generates a foreground image representing the object containing an associated depth image thereof according to the first image with the associated depth image thereof and according to the second image with the associated depth image thereof; and
a first reprojector that maps 3D points of the foreground image to camera coordinates based on an initial intrinsic matrix, thereby generating the first 3D points in camera coordinates.

6. The system of claim 5, further comprising:
a second reprojector that maps the 3D points of the foreground image to camera coordinates based on a current intrinsic matrix, thereby generating second 3D points in camera coordinates; and
a mapping device that maps the second 3D points from camera coordinates to chessboard coordinates, thereby generating the 3D points in chessboard coordinates;
wherein parameters of the current intrinsic matrix are adjusted if the current error metric is greater than the previous error metric.

7. A geometric camera calibration method, comprising:
performing an extrinsic iterative closest point (ICP) operation that generates an estimated extrinsic matrix by adjusting an initial extrinsic matrix according to first 3D points in camera coordinates; and performing an intrinsic ICP operation that receives 3D points in chessboard coordinates and accordingly generates an error metric between the 3D points in chessboard coordinates and predetermined second reference 3D points;

wherein the extrinsic ICP operation minimizes difference between the 3D points in camera coordinates and predetermined first reference 3D points; and wherein a current intrinsic matrix is then outputted as an updated intrinsic matrix if a current error metric is not greater than a previous error metric.

8. The method of claim 7, wherein the initial extrinsic matrix is used as an initial solution of the extrinsic ICP operation to generate the estimated extrinsic matrix.

9. The method of claim 7, further comprising providing at least one three-dimensional (3D) camera that captures a first image with an associated depth image of a chessboard having a predetermined feature pattern without a given object, and captures a second image with an associated depth image of the chessboard with the object.

10. The method of claim 9, further comprising:
generating the initial extrinsic matrix according to the first image.

11. The method of claim 9, further comprising:
generating a foreground image representing the object containing an associated depth image thereof according to the first image with the associated depth image thereof and according to the second image with the associated depth image thereof; and first reprojecting 3D points of the foreground image to camera coordinates based on an initial intrinsic matrix, thereby generating the first 3D points in camera coordinates.

12. The method of claim 11, further comprising:
second reprojecting the 3D points of the foreground image to camera coordinates based on a current intrinsic matrix, thereby generating second 3D points in camera coordinates; and mapping the second 3D points from camera coordinates to chessboard coordinates, thereby generating the 3D points in chessboard coordinates;

wherein parameters of the current intrinsic matrix are adjusted if the current error metric is greater than the previous error metric.

* * * * *